United States Patent [19]
Harada et al.

[11] 3,843,150
[45] Oct. 22, 1974

[54] RAPIDLY INFLATABLE IMPACT CUSHIONING DEVICE FOR HIGH-SPEED TRAVELLING VEHICLE

[75] Inventors: Ikuo Harada, Tokyo; Masafumi Hamasaki, Nobeoka; Isao Maeda, Nobeoka; Nobuyuki Izawa, Nobeoka, all of Japan

[73] Assignee: Asahi Kasei Kogyo Kabushiki Kaisha, Osaka, Japan

[22] Filed: Nov. 23, 1971

[21] Appl. No.: 201,332

[30] Foreign Application Priority Data
Mar. 1, 1971  Japan............................. 46-10004
Nov. 26, 1970  Japan............................. 45-103696
Nov. 24, 1970  Japan............................. 45-102724

[52] U.S. Cl............ 280/150 AB, 5/348 R, 182/137, 244/138 R
[51] Int. Cl. ........................................ B60r 21/08
[58] Field of Search .......... 280/150 AB; 244/138 R; 5/348 R; 182/137

[56] References Cited
UNITED STATES PATENTS
2,974,912  3/1961  Namsick .................... 244/138 R
3,370,886  2/1968  Frost ........................ 280/150 AB
3,675,942  7/1972  Huber........................ 280/150 AB
3,715,130  2/1973  Harada et al............... 280/150 AB Primary Examiner—David Schonberg
Assistant Examiner—John P. Silverstrim
Attorney, Agent, or Firm—Stevens, Davis, Miller & Mosher

[57] ABSTRACT

This invention relates to the structure of the bag system of a personal safety bag to be used in an impact cushioning device designed for protecting an occupant in an automobile or some other high-speed travelling vehicle against accidents due to violent deceleration such as by collision and to the air passage provided on the said bag system for permitting admission and discharge of the outer air.

4 Claims, 14 Drawing Figures

PATENTED OCT 22 1974

(iii)

3,843,150

RAPIDLY INFLATABLE IMPACT CUSHIONING DEVICE FOR HIGH-SPEED TRAVELLING VEHICLE

BACKGROUND TO THE INVENTION

In recent years there has been an increasing demand for protecting the occupants of automobiles and other high-speed travelling vehicles against possible injuries resulting from voilent deceleration of their vehicles due to collision. For this purpose, there have been developed rapidly inflatable impact cushioning bags, which are so constructed that, at the moment of collision, the impact is sensed and actuates a gas generating means and the inflatable bag is inflated with the gas released from the gas generating means. The inflated bag prevents the occupant's body being thrown forward and alleviates the impact forces exerted on his body, with the result that the occupant is protected against injuries which would otherwise be inflicted upon his body. In this case, the bag is required to have a fairly large volume. To inflate a bag of so large a volume, the source of gas is naturally expected to have a large capacity. When the rapidly inflatable bag of the conventional operating principle as mentioned above is used in a substantially airtight vehicle interior, the bag possibly produces sound pressure waves while in the course of inflation or the pressure inside the vehicle interior tends to rise. the consequent abrupt exertion of pressure may give rise to such secondary injurious effects as breakage of the ear drums of the occupants of the vehicle. To preclude such danger, it is necessary to provide an additional device specially designed to break the rear wind shield and admit the outer air at the moment of collision. These are the drawbacks of the conventional inflatable bags.

BRIEF SUMMARY OF THE INVENTION.

It is the main object of this invention to provide a rapidly inflatable impact cushioning bag for use on high-speed travelling vehicles, which bag is rapidly inflated and unfolded the moment an impact, such as a collision, is sensed so as to safely receive and hold back an occupant's body which is being thrown forward by virtue of inertia, and to substantially eliminate the above mentioned drawbacks.

To accomplish this main object, the present invention first provides a rapidly inflatable impact cushioning bag which comprises a rapidly inflatable cushioning bag member and an unfoldable inflating bag member. The cushioning bag member is provided with an air passage adapted to permit admission and discharge air outside bag. The inflating bag member is disposed within the cushioning bag member and is adapted to be inflated with the compressed gas supplied from a gas source. When an automobile or some other high-speed travelling vehicle equipped with this rapidly inflatable impact cushioning bag comes into collision with another object, either generation or supply of compressed gas is started by an impact-sensing means, causing the aforementioned unfoldable inflating bag member to be inflated rapidly and, at the same time, the rapidly inflatable cushioning bag member to be unfolded, Simultaneously, the outer air is admitted through the air passage to inflate and unfold the rapidly inflatable cushioning bag to its full capacity. Thus, a bag member of a large volume can easily be inflated and unfolded by using a relatively small volume of gas from the gas source.

Secondly, this invention provides a rapidly inflatable impact cushioning bag system which comprises an impact cushioning bag member and at least one unfoldable inflating bag member of the shape of a hollow column. The impact cushioning bag is disposed on a supporting member and provided with an air passage adapted to permit admission and discharge of the outer air. The said unfoldable inflating bag member is built inside the said impact cushioning bag member, disposed similarly on the aforementioned supporting member, and adapted to be inflated and unfolded with compressed gas or a gas generating means.

Thirdly, this invention provides a rapidly inflatable impact cushining bag system which is so constructed that the ratio between the diameter of the discharging outlet of the air passage in the unfoldable inflating bag member and the diameter of the air passage in the rapidly inflatable cushioning bag member has a fixed value, the ratio of the air passage in the rapidly inflatable cushioning bag member to the inner volume of the cushioning bag member has a value exceeding a fixed level, and the ratio of the inner volume of the unfoldable inflating bag member to the inner volume of the rapidly inflatable cushioning bag member also has a value exceeding a fixed level. These ratios are so selected that the impact exerted on the occupant's body is lessened effectively when the rapidly inflatable cushioning bag member being inflated and unfolded with the incoming outer air comes into contact with the occupant's body being thrown forward upon violent deceleration of the high-speed travelling vehicle such as by collision.

DETAILED DESCRIPTION.

Figure 1:
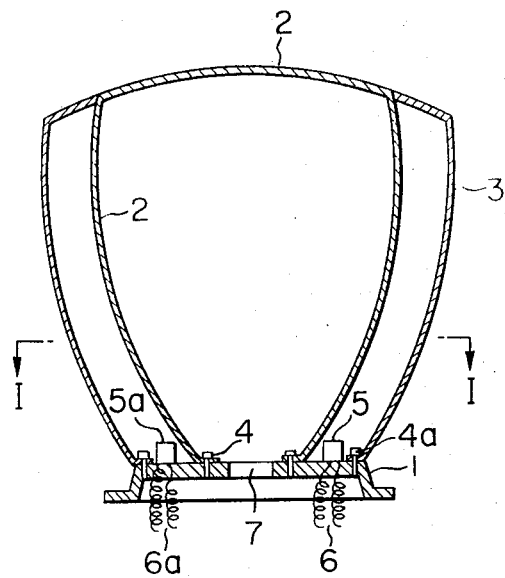
FIG. 1 is a partly sectional view of a rapidly inflatable cusioning bag member having an unfoldable inflating bag member attached inseparably thereto in its inflated state.
Figure 2:
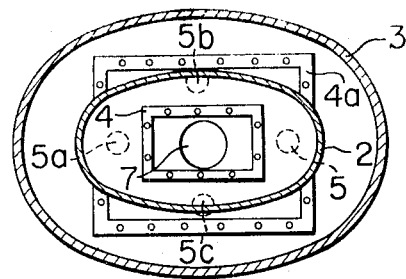
FIG. 2 is a cross-sectional view taken along the line I — I of FIG. 1.

In FIG. 1 and FIG. 2, 1 denotes a supporting member for supporting the bag members, 2 denotes a rapidly inflatable cushioning bag member made of such cloth as nylon fabric having high tensile and tear strengths, and 3 denotes an unfoldable inflating bag member bonded or sewn onto the periphery of the bag member 2 so as to form an inseparable unit with the bag member 2. The bag member 2 and the unfoldable inflating bag member 3 are fastened with bolts onto the supporting member 1 via supporting frames 4 and 4a.

Denoted by 5, 5a, 5b, and 5c are gas-generating means disposed on the supporting member 1 so as to permit supply of the gas into the unfoldable inflating bag member 3. The sources from which the gas used for this purpose may be drawn include such liquid compressed gases as Freon gas and carbonic acid gas, air, nitrogen and other gases preserved in a highly compressed state, and gas-generating compositions such as explosives and combustible substances. The gas-generating means 5, 5a, 5b and 5c are disposed directly on the supporting member 1 in the case of the embodiment illustrated. Otherwise, they may be disposed at a remote place and connected, by means of pipes, so as to introduce the released gas into the interior of the unfoldable inflating bag member 3. Denoted by 6 and 6a are electric conductors for electrically actuating the gas-generating means 5, 5a, 5b and 5c. They are connected to an outer power source (not illustrated) and a shock-detecting means so as to form an electric circuit.

When the gas-generating means 5, 5a, 5b and 5c are actuated, the unfoldable inflating bag member 3 which remains in a shrunken state at normal temperatures is rapidly inflated and unfolded to the shape of a bar with the gas generated or supplied consequently. As the unfoldable inflating bag member is inflated and unfolded, the cushioning bag member 2 which forms an inseparable unit therewith is expanded simultaneously. This gives rise to negative pressure inside the cushioning bag member 2, causing the said bag member 2 to be inflated with the outer air being introduced via the air passage 7. As a whole, the cushioning bag member 2 is inflated and unfolded as illustrated in FIG. 1. The aforementioned air passage 7 may have a circular, triangular or polygonal shape, whichever may be convenient for the purpose.

In the case of the rapidly inflatable cusioning bag member of the present invention, the amount of the gas to be generated or supplied by the gas-generating means 5, 5a, 5b and 5c need not be more than is required for inflating the unfoldable inflating bag member 3 excluding the volume of the cushioning bag member 2.

In putting the rapidly inflatable impact cushioning bag system of this invention to practical use, both cushioning bag member 2 and unfoldable inflating bag member 3 are disposed in their folded state on the dashboard or on the rear side of the seat in front of the occupant inside the automobile, for example.

Now, a description is given of the rapidly inflatable cushioning bag member of the type incorporating therein at least one built-in, unfoldable inflating bag member. In FIG. 3, FIG. 4, and FIG. 5, 1 denotes a supporting member adapted to support in position a bag member and fixed such as onto the seat and 2 denotes a bag member fixed with bolts onto the said supporting member 1 via a supporting frame 4 having a rectangular or other shape. Usually this bag is made of such cloth as nylon fabric which has high tensile and tear strengths. Denoted by 3, 3a, 3b, and 3c are unfoldable inflating bag members of the shape of vertically oblong, hollow columns fixed onto the said supporting member 1 and disposed inside the cushioning bag member 2 so as to serve the purpose of unfolding and inflating the cushioning bag member. Numerals 5, 5a, and 5c denote gas-generating means disposed on the said supporting member 1 so as to supply the required gas into the corresponding unfoldable inflating bag members 3, 3a, 3b, and 3c. The gas-generating means, 5, 5a, 5b, and 5 c are positioned so as to serve the unfoldable inflating bag members 3, 3a, 3b, and 3c respectively. There may be used one common gas-generating means unstead of using an individual gas-generating means for each of the unfoldable inflating bag members 3, 3a, 3b, and 3c. The gas-generating means 5 may be disposed other than an the supporting member 1. In this case, pipes are laid so as to forward the gas from the gas-generating means to the interiors of the unfoldable inflating bag members 3, 3a, 3b, and 3c.

Numerals 6, 6a (6b, and 6c which are not illustrated) denote electric conductors which serve to electrically actuate the gas-generating means 5, 5a, (5b, and 5c). These electric conductors are connected so as to form an electric circuit together with an outside power source and an impact-detecting means (not illustrated).

Numeral 7 denotes an air passage formed at the center of the supporting member 1 and adapted to admit and discharge the outer air. This air passage admits the outer air into the cushioning bag member 2 as the unfoldable inflating bag members 3, 3a, 3b, and 3c are inflated and unfolded from their shrunken state by means of the compressed gas. When the occupant's body thrown forward comes into contact with the cushioning bag member 2 being inflated at the time of the vehicle's violet deceleration as by collision, this air passage 7 serves the purpose of discharging the air from within the cushioning bag member as the pressure inside this bag 2 rises because of the contact. This air passage 7 may be disposed directly on the bag member 2. Numerals 8 and 8a denote holes formed on the supporting member 1 at positions corresponding to the unfoldable inflating bag members and intended as gas discharging means. These holes serve the purpose of discharging the gas from within the unfoldable inflating bag members 3 and 3a when the occupant's body being thrown forward comes into contact with the rapidly inflatable cushioning bag member 2 at the time of the high-speed travelling vehicle's violent deceleration as by collision. These gas discharging holes may be positioned directly on the unfoldable inflating bag members. The gas discharging holes 8 and 8a may be substituted with discharge valves. The unfoldable inflating bag members, when set to motion, are required to cause the cushioning bag member to be unfolded and inflated stably to its full capacity without producing any slackening. For this reason, it is desirable that they are constructed so as to have a length slightly greater than that of the cushioning bag member. When the occupant's body comes into contact with the rapidly inflatable cushioning bag member 2 in an inflated state at the time of the high-speed travelling vehicle's violet deceleration and, consequently, the pressure inside the cushioning bag member 2 rises and the pressure inside the unfoldable inflating bag members 3 and 3a rises, the gas inside the unfoldable inflating bag members 3 and 3a is discharged via the gas discharging holes 8 and 8a in the same way as the air inside the rapidly inflatable cushioning bag member 2 is discharged via the air passage 7. Thus, the rapidly inflatable bag system has its impact cushioning capacity improved as a whole.

Figure 3:
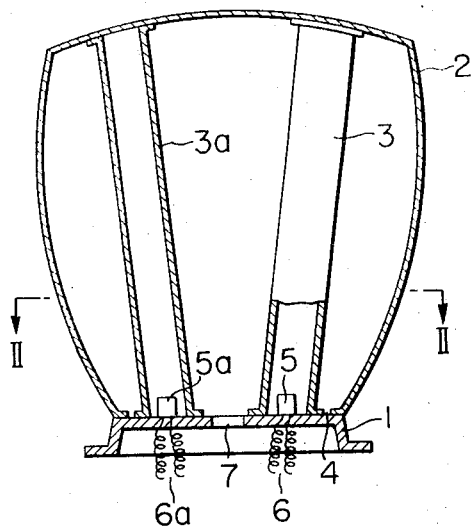
FIG. 3, is a partly sectional view of a rapidly inflatable cushioning bag member incorporating therein at least one built-in unfoldable inflating bag member in its inflated state.
Figure 4:
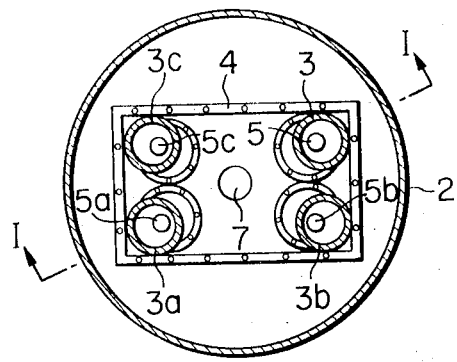
FIG. 4, is a cross-sectional view of the bag taken along the line II—II of FIG. 3.
Figure 5:
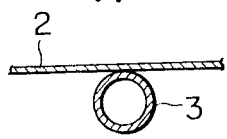
FIG. 5, is a cross-sectional view of the bag of FIG. 4 showing the condition in which the unfoldable inflating bag member is attached therein.
Figure 5:
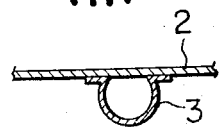

At normal temperatures, the unfoldable inflating bag members 3, 3a, 3b, and 3c of the shape of hollow columns are in their shrunken state. When the gas is supplied into their interiors, they are inflated and unfolded into the shape of bars, causing the encircling bag member 2 to be inflated and unfolded uniformly. At least one such unfoldable inflating bag member is disposed as a suitable position with respect to the bag member 2. Preferably the unfoldable inflating bag members 3, 3a, 3b, and 3c are made of such cloth as nylon fabric incorporating a topping of synthetic rubber which has high tensile and tear strengths and has no permeability to gas. The unfoldable inflating bag members 3, 3a, 3b, and 3c are disposed separately of the cushioning bag member 2 as illustrated in FIG. 3 and FIG. 4. Otherwise, they may be disposed so as to be bonded or sewn onto the inner wall of the cushioning bag member 2 as illustrated in FIG. 5 (i) and (ii). Other than the circular cross section illustrated, the unfoldable inflating bag member 3 of the shape of a hollow column may have a triangular, tetragonal, elliptical or any other cross section as desired.

In the rapidly inflatable device of the construction mentioned above, the gas-generating means 5, 5a, 5b, and 5c are actuated when an electric current flows to the conductors 6 and 6a. As the compressed gas is supplied consequently, the unfoldable inflating bag members 3, 3a, 3b, and 3c are rapidly inflated and unfolded into the shape of bars. As the unfoldable inflating bag members 3, 3a, 3b, and 3c are inflated and unfolded, the rapidly inflatable cushioning bag member 2 is expanded simultaneously. This gives rise to negative pressure inside the cushioning bag member 2, with the result that the cushioning bag member 2 is inflated by the outer air being sucked in through the air passage 7. As a whole, the cushioning bag member 2 is inflated and unfolded to the state illustrated in FIG. 3.

In the case of the rapidly inflatable device according to the present invention, the amount of the gas generated or supplied from the gas-generating means 5, 5a, 5b, and 5c need not be more than is required for filling the unfoldable inflating bag members 3, 3a, 3b, and 3c to capacity. The unfoldable inflating bag member 3 (3a, 3b, and 3c) used in the rapidly inflatable device of this invention is in the shape of a hollow column. When the gas is supplied from the gas-generating means, therefore, the direction in which the bag member is inflated and unfolded is fixed. Further, because of the simplicity of structure, the unfoldable inflating bag member of this shape can be inflated and unfolded to full capacity more rapidly and attached to the cushioning bag member more easily than that of any other shape. These constitute the advantages of the rapidly inflatable device of this invention.

In putting the rapidly inflatable impact cushioning bag system of the present invention to practical use, both cusioning bag member and unfoldable inflating bag member are attached in their folded and shrunken state to the dashboard or to the rear side of the seat in front of the occupant's in an automobile, for example.

As mentioned above, the rapidly inflatable impact cushioning bag system illustrated in FIG. 3 comprises a cushioning bag member adapted for holding back the occupant body thrown forward and an unfoldable inflating bag member of the shape of an vertically oblong hollow column disposed inside the said cushioning bag member. Therefore, the amount of the compressed gas generated or supplied from the gas-generating means need not be more than is required for filling the unfoldable inflating bag member to full capacity. This means that the present bag system has an advantage of saving the gas as compared with the conventional rapidly inflatable cushioning bag system which requires the compressed gas to be supplied so as to fill the whole bag member of a larger volume. For the same reason, the sound pressure which occurs while the bag member is in the process of inflation is very low and, therefore, has no possibility of causing ear trouble on the part of the occupant. Since the outer air, namely, the air existing in the vehicle interior, is used for inflating and unfolding the bag member, possible rise of pressure inside the vehicle interior is minor. Accordingly, the present bag system has less possibility of the pressure rise inside the vehicle interior causing troubles such as breakage of window glass.

Figure 6:
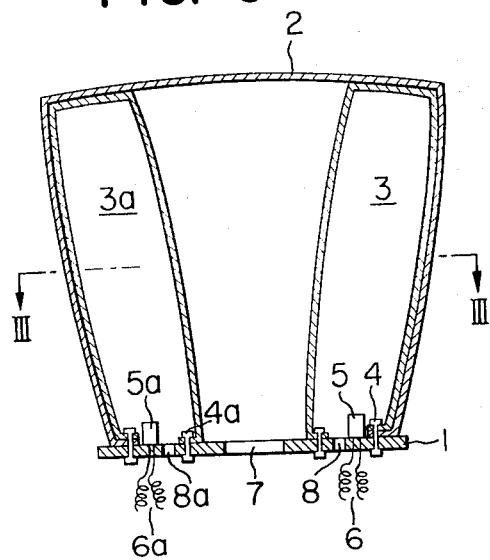
FIG. 6 is a partly sectional view showing an unfoldable inflating bag member provided with a gas discharging means.
Figure 7:
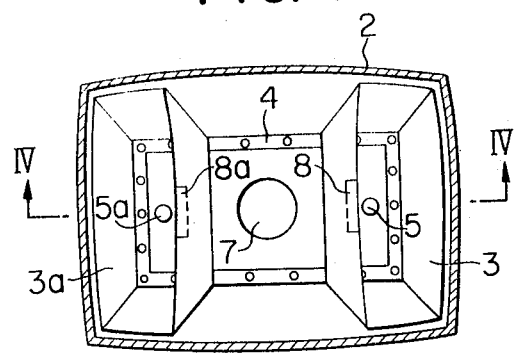
FIG. 7 is a cross-sectional view taken along the line III—III of FIG. 6.

FIG. 6 and FIG. 7 illustrate a gas discharging means additionally incorporated in the unfoldable inflating bag member used in the system illustrated in FIG. 1 or FIG. 3. In FIG. 6 and FIG. 7, as in FIG. 1 and FIG. 3, 1 denotes a supporting member for the bag member, 2 denotes a rapidly inflatable cushioning bag member, and 3 and 3a denote unfoldable inflating bag members. In this case, there are used two unfoldable inflating bag members which have the shape of columns and are disposed inside the cushioning bag member 2 symmetrically with respect thereto. Numerals 4 and 4a denote supporting frames serving to fix the supporting member 1 in position, 5 and 5a denote gas-generating means serving to supply the gas and thereby inflate the unfoldable inflating bag members 3 and 3a, and 6 and 6a denote electric conductors serving to electrically actuating the gas-generating means and connected to an impact detecting means. Denoted by 7 is an air passage adapted to admit the outer air into the rapidly inflatable cushioning bag member 2 while the unfoldable inflating bag members 3 and 3a are being unfolded and to discharge the air from within the cushioning bag member 2 when the occupant's body impings thereupon.

Figure 8:
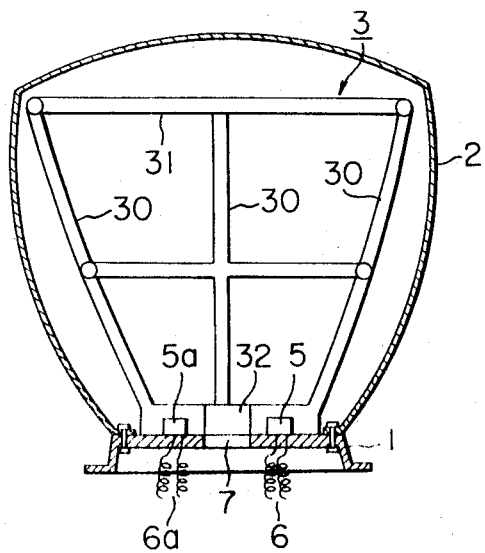
FIG. 8 and FIG. 9 illustrate modifications of the unfoldable inflating bag member.
Figure 9:
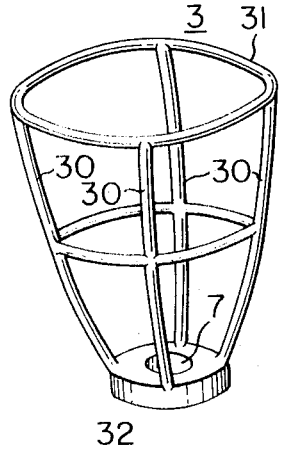
Figure 9:
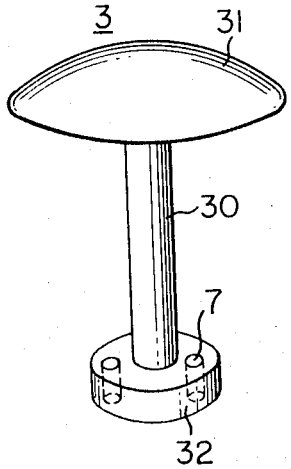
Figure 9:
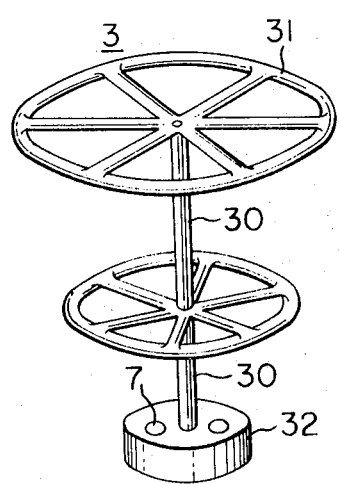

FIG. 8 and FIG. 9 illustrate the possibility of the modification of the unfoldable inflating bag member illustrated in FIG. 1. FIG. 9 (i), (ii) and (iii) are examples of such modification. Numeral 1 denotes a supporting member, 2 denotes a cushioning bag member, 5 and 5a denote gas-generating means serving to inflate the unfoldable inflating bag member 3, and 6 and 6a denote electric conductors which are connected to an impact detecting means serving to sense impacts and actuate the gas-generating means. Denoted by 7 is an air passage serving to admit or discharge the outer air. The unfoldable inflating bag member 3 which is inflated with the gas generated by the operation of the gas-generating means 5 and 5a is an unfoldable elastic element disposed within the rapidly inflatable cushioning bag member 2 so as to unfold the said bag member 2. It is formed in a suitable three-dimensional shape as illustrated in FIG. 8 by having a plurality of hollow tubes 30 and 31 interconnected.

In a hollow chamber 32 formed at the base of the unfoldable inflating bag member, there are provided gas-generating means 5 and 5a adapted to supply the compressed gas to the aforesaid hollow tubes 30 and 31 (or open ends of these pipes are connected to a separately provided gas source). The compressed gas is supplied via the hollow chamber 32 into the hollow pipes 30 and 31 of the unfoldable inflating bag member 3 to inflate and unfold the bag member to the state illustrated in FIG. 8. Consequently, the cushioning bag member 2 is simultaneously inflated and unfolded, with the result that the outer air is admitted via the air passage 7 into the rapidly inflatable cushioning bag member 2.

The unfoldable inflating bag member 3 is disposed inside the cushioning bag member 2. As it is unfolded and inflated with the compressed gas supplied via the hollow chamber 32 to the hollow tubes 30 and 31, it assumes an unyielding shape and has an overall effect of inflating and unfolding the cushioning bag member 2 which is disposed around its periphery. Generally, the unfoldable inflating bag member 3 is disposed separately of the cushioning bag member 2 as illustrated in FIG. 8. Otherwise, it may be bonded or sewn onto the inner wall of the cushioning bag member 2. Preferably the unfoldable inflating bag member 3 is made of such cloth as nylon fabric incorporating a topping of synthetic rubber which has high tensile and tear strengths. The unfoldable inflating bag member 3 may be formed in any suitable shape. Examples of the shape are illustrated in FIG. 9 (i), (ii) and (iii).

An explanation has been given to the relationship between the rapidly inflatable cushioning bag member and the unfoldable inflating bag member adapted to inflate and unfold the cushioning bag member and to the shape and construction of such bag members. Now, an explanation is given hereinafter with respect to the ratios among the inner volumes of the rapidly inflatable cushioning bag member and the unfoldable inflating bag member and the diameter of the gas discharge outlet provided on the bag member, the ratios which are to be satisfied for ensuring the perfect safety of the occupant's body as it impinges on the rapidly inflatable cushioning bag member in an inflated state.

In the rapidly inflatable impact cushioning bag system of the so-called air-suction type having one or more hollow unfoldable inflating bag members provided inside a rapidly inflatable cushioning bag member possessed of an air passage adapted to admit and discharge the outer air, namely, a bag system wherein the unfoldable inflating bag member is rapidly inflated and unfolded by rapidly introducing therein the gas to cause the rapidly inflatable cushioning bag member to be unfolded simultaneously and, at the same time, the outer air is admitted so as to have the bag members inflated and unfolded collectively, it is naturally desirable for the bag system to be capable of being inflated and unfolded as rapidly as possible. Even when the high-speed travelling vehicle is running at a high speed (60 miles/hour, for example), it is logical to assume that the operator applies brakes immediately before the time of collision. As a consequence, the vehicle's travelling speed is usually brought down to the level of about 30 miles/hour (equivalent to 48 km/hour) by the moment of collision, even in the worst instance.

When an automobile travelling at a speed of 48 km/hour collides into an object lying forward, it is 40 to 45 ms after the moment of collision that the occupant's body starts its forward movement of intertia. The impact detecting means which is currently studied begins to operate within 10 to 15 ms of the moment of collision when the collision takes place at a travelling speed of 48 km/hour. In order to effectively lessen the impact which is exerted upon the occupant's body at the time of collision of the high-speed travelling vehicle, it is essential that the aforesaid rapidly inflatable bag system should be inflated and unfolded to full capacity within at most 35 ms of the actuation of the gas-generating means immediately following the collision to receive the occupant's body thrown forward and that the impact exerted on the occupant's body at the moment of impingement upon the inflated bag member should be lessened with a repulsive force low enough to prevent any adverse effects from being produced thereafter on the body. When the travelling speed at the time of collision is varied, the time at which the occupant's body starts its forward movement of intertia and the time at which the impact of collision are charged in proportion to the magnitude of travelling speed, with the result that a period of 35 ms is interposed between the two events. This means that the protection of the occupant's body against effects of violent deceleration can be made in time at all conceivable speeds of collision so far as the bag member can be inflated and unfolded to full capacity within 35 ms. For the sake of brevity, the rapidly inflatable cushioning bag member is hereinafter referred to as "main bag member.".

The inventors conducted various researches with a view to satisfying the aforementioned requirements. As a consequence, they have made the following discovery: To effectively lessen the impact exerted upon the occupant's body at the moment of violent deceleration of the high-speed travelling vehicle as by collision, it is essential that in the rapidly inflatable impact cushioning device of the aforesaid air-suction type, the ratio of the inner volume of the unfoldable inflating bag member to the inner volume of the main bag member should have a value exceeding a prescribed level, the ratio of the diameter of the air passage in the main bag member to the inner volume of the main bag member should have a value in excess of a prescribed level, and the ratio of the diameter of the gas discharging outlet in the unfoldable inflating bag member to the diameter of the air passage in the main bag member should fall in a prescribed range. The term "inner volume of the main bag member" as used herein means the total inner volume of the main bag member including the inner volume of the unfoldable inflating bag member built in the main bag member.

In the rapidly inflatable impact cushioning device of the air-suction type which comprises a main bag member provided with an air passage adapted to admit and discharge the outer air and at least one hollow, unfoldable inflating bag member built inside the main bag member, adapted to be filled and inflated with the compressed gas, and possessed of a gas discharging means at one part thereof, this invention is characterized in that the ratio of the inner volume of the unfoldable inflating bag member to the inner volume of the main bag member exceeds 0.2, the ratio of the hydraulic diameter (mm) of the air passage to the inner volume (liter) of the main bag member exceeds 0.37, and the diameter of the air passage in the main bag member and the diameter of the gas discharging outlet in the unfoldable inflating bag member has the following relationship:

$$-2/15 \text{ MD} + 58 \leq \text{TD} \leq -7/18 \text{ MD} + 105$$

When the conditions are fulfilled, the impact cushioning system can inflate and unfold the bag members within the time limit mentioned above and lessen the impact exerted upon the occupant's body with repulsive force low enough to prevent any adverse effects from being produced on the occupant's body.

In the formula given above, TD stands for the hydraulic diameter of the gas discharging outlet in the unfoldable inflating bag member as expressed by the unit of mm. The term "hydraulic diameter" means the diameter of the cross-sectional area of the gas discharging outlet in the unfoldable inflating bag member as obtained by converting that cross-sectional area to the area of a true circle having the equal area. Where there are used two or more gas discharging outlets, the hydraulic diameter is that which is obtained by converting the combined area of the two or more outlets to the area of one true circle having the equal area. MD stands for the hydraulic diameter of the air passage in the main bag member as expressed by the unit of mm. The hydraulic diameter in this case has the same meaning as in the case of TD.

Test examples are cited hereinafter to aid in clarifying the foregoing explanation covering the ratio of the inner volume of the unfoldable inflating bag member to the inner volume of the main bag member, the ratio of the diameter of the air passage in the main bag member to the inner volume of the main bag member, and the preferred range of ratio of the diameter of the gas discharging outlet in the unfoldable inflating bag member to the diameter of air passage in the main bag member.

Main bag member – Base cloth woven with 210-d nylon yarn "Leona SS" (made by Asahi Chemical Industry Co., Ltd.) Volume 170 liters Unfoldable inflating bag member — Base cloth woven with 840-d nylon yarn "Leona SS" (made by Asahi Chemical Industry Co., Ltd.) having the inside lined with a rubber sheet (0.6 mm). Two bag members were used.

Gas-generating means — Gas-generating agent, smokeless powder of 1 : 2 ($Pb_3O_3$ — B) mixture.

Stroke of bag member — 700 mm

Air passage in the main bag member — 150 mm in diameter

Gas discharging outlet in the unfoldable inflating bag member — 80 mm in diameter (combined hydraulic diameter of two outlets in two unfoldable inflating bag members)

Figure 10:
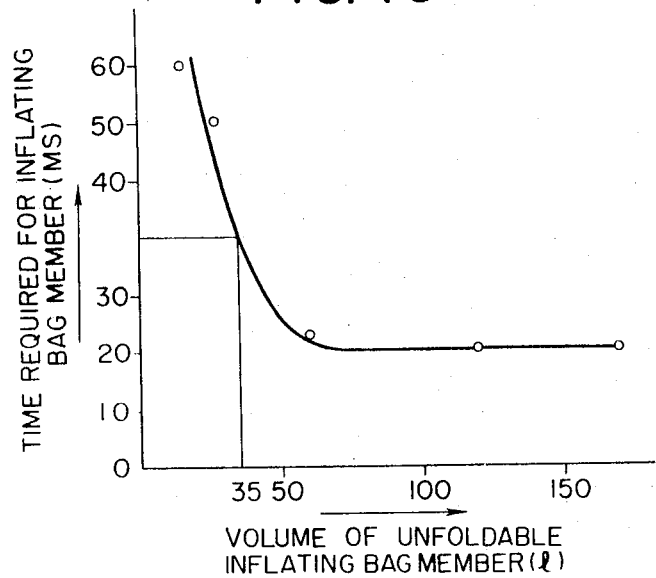
FIG. 10 shows graphically the relationship between the time of inflation and the volume of the unfoldable inflating bag member.

Under the conditions given above, the time required for inflating and unfolding the main bag member and the volume of the unfoldable inflating bag member (combined volume in the case of two or more bag members) had the relationship as shown in FIG. 10.

From the standpoint of the perfect safety of the occupant's body, the upper limit of the time required for unfolding and inflating the main bag member to full capacity was set to 35 ms as computed from the moment the impact detecting means sensed the violent deceleration of the travelling vehicle as by collision and actuated the gas-generating means. FIG. 10 indicates that the volume of the unfoldable inflating bag member corresponding to this time limit is 35 liters. That is to say, the volume of the unfoldable inflating bag member is required to have a volume of at least 35 liters in order that the main bag member may be inflated and unfolded to full capacity within 35 ms of the time the gas-generating means is actuated. Therefore, the ratio of the volume of this unfoldable inflating bag member to the inner volume of the main bag member satisfies the following relationship:

$$TV/MV = 35/170 \geq 0.2$$

wherein, TV stands for the inner volume of the unfoldable inflating bag member (in liters) (combined volume in the case of two or more bag members) and MV stands for the inner volume (in liters) of the main bag member.

In this test, the ratio of the inner volume of the unfoldable inflating bag member to the inner volume of the main bag member remained similar even when the inner volume of the main bag member, the diameter of the air passage in the main bag member, and the diameter of the gas discharging outlet of the unfoldable inflating bag member were changed. From the foregoing observations, it has been learnt that, to effectively lessen the impact exerted on the occupant's body at the time of violent deceleration of the travelling vehicle as by collision by the use of the rapidly inflatable impact cushioning system of the air-suction type according to the present invention, the ratio of the inner volume of the unfoldable inflating bag member to the inner volume of the main bag member should be fixed at a value exceeding the minimum level of 0.2.

The present bag system of the air-suction principle can no longer serve as a safe bag if the ratio of the inner volume of the unfoldable inflating bag member to the inner volume of the main bag member has too large a value. When an automobile travelling with all the windows kept in their tightly closed state collides into an object and, consequently, the safety bag is unfolded and inflated, the pressure inside the automobile interior rises sharply and induces disadvantageous effects. To preclude such disadvantage, the ratio of the inner volume of the unfoldable inflating bag member to the inner volume of the main bag member is required to be controlled below about 0.8.

Another test was conducted under the following set of conditions:

Main bag member — Base cloth same as in the test described above

Volume, 170 liters

Unfoldable inflating bag member — Base cloth same as in the test described above Volume 60 liters (two bags each of 30 liters)

Gas-generating means — 18 g of gas-generating agent of the same composition as mentioned above was used for each unfoldable inflating bag member.

Stroke of bag member — 700 mm

Gas discharging outlet in the unfoldable inflating bag member — 70 mm in diameter (combined hydraulic diameter of two outlets in two unfoldable inflating bag members)

Figure 11:
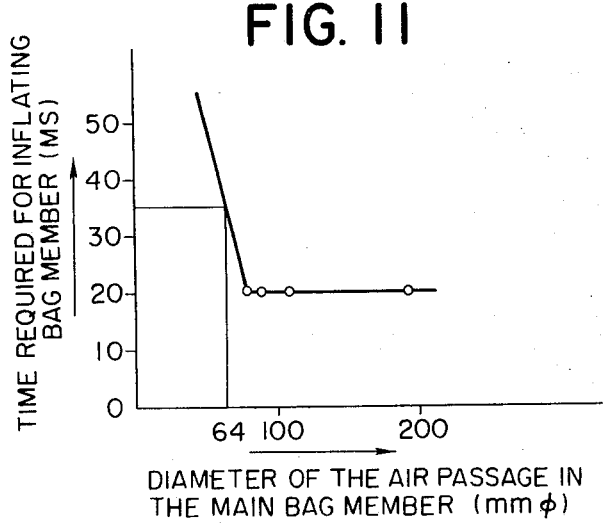
FIG. 11 shows graphically the relationship between the time of inflation and the hydraulic diameter of the air passage in the cushioning bag member.

Under these conditions, the relationship between the time required for unfolding and inflating the main bag member and the diameter of the air passage in the main bag member was as shown in FIG. 11. From the standpoint of the perfect safety of the occupant's body, the upper limit of the time required for unfolding and inflating the main bag member was set to 35 ms as computed from the moment the impact detecting means sensed the violent deceleration of the travelling vehicle as by collision and actuated the gas-generating means as in the previous test. FIG. 11 indicates that the diameter of the air passage in the main bag member corresponding to this time limit is 64 mm. That is to say, the diameter of the air passage in the main bag member is required to exceed the minimum level of 64 mm in order that the main bag member may be unfolded and inflated to full capacity within 35 ms of the moment the gas-generating means is actuated. Therefore, the ratio of the diameter of the air passage in the main bag member to the inner volume of the main bag member satisfies the following relationship:

$$MD/MV = 64/170 \geq 0.37$$

wherein, MD stands for the hydraulic diameter (in mm) of the air passage in the main bag member and MV for the inner volume (in liter) of the main bag member.

In this test, the ratio of the inner volume of the unfoldable inflating bag member to the inner volume of the main bag member remained similar even when the inner volume of the main bag member and the inner volume of the unfoldable inflating bag member were changed. From the foregoing observations, it has been learnt that, to effectively lessen the impact exerted on the occupant's body at the time of violent deceleration of the travelling vessel such as by collision by the use of the rapidly inflatable impact cushioning device of the aforementioned air-suction type according to the present invention, the ratio of the hydraulic diameter (in mm) of the air passage in the main bag member to the inner volume of the main bag member should exceed the minimum level of 0.37.

Here, the diameter of the air passage in the main bag member is given in terms of hydraulic diameter. The same results were obtained when the air passage had an elliptic, triangular, tetragonal or any other shape or when there were used two or more air passages.

In case where the impact exerted upon the occupant's body is effectively lessened with the bag member's repulsive force mild enough to prevent any adverse effect from being produced on the occupant's body by the use of the rapidly inflatable system unfolded and inflated to full capacity at the moment of violent deceleration of the high-speed travelling vehicle as by collision, the relationship between the hydraulic diameter of the air passage in the main bag member and that of the gas discharging outlet of the unfoldable inflating bag member has quite a significant effect in the rapidly inflatable system of air-suction principle according to the present invention.

Still another test was carried out under the following set of conditions:

Main bag member — Base cloth same as in the test described above

Volume 170 liters

Unfoldable inflating bag member — Base cloth same as in the test described above Volume 60 liters (two bags each of 30 liters)

Gas-generating means — 18 g of gas-generating agent of the same composition as mentioned above was used for each unfoldable inflating bag member.

Diameter of the air passage in the main bag member — 150 mm, 90 mm and 40 mm

Stroke of bag member — 700 mm

Travelling speed of truck — 48 km/hour

Weight of dummy — 75 kg

Figure 12:
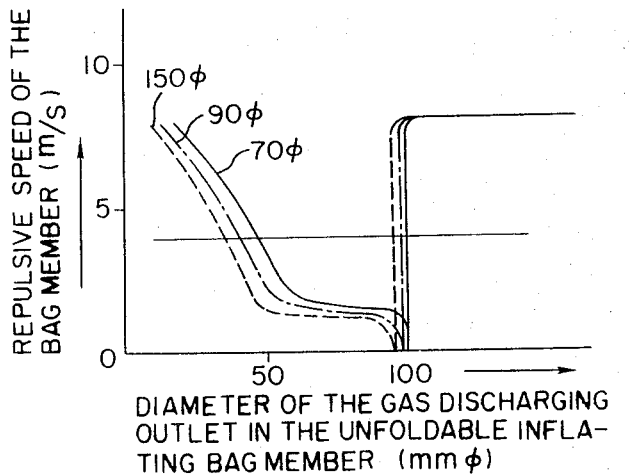
FIG. 12 shows graphically the relationship between the repulsive velocity of the occupant and the hydraulic diameter of the gas discharge outlet in the unfoldable inflating bag member.

The relationship between the repulsive speed of the dummy after the reduction of impact and the diameter of the gas discharging outlet in the unfoldable inflating bag member as determined for the varying diameters 150 mm, 90 mm and 70 mm of the air passage in the main bag member is shown in FIG. 12. From the medical point of view, the upper limit of the repulsive speed of the bag member at which no adverse effect is produced on the human system is fixed at 4.0 m/sec. For the diameter 150 mm of the air passage in the main bag member, therefore, the permissible range of hydraulic diameter of the gas discharging outlet in the unfoldable inflating bag member is from 40 mm to 95 mm. From FIG. 12, it can be seen that, if the hydraulic diameter of the gas discharging outlet of the unfoldable inflating bag member does not exceed 40 mm, then the occupant's body is exposed to possible secondary effects imputable to the repulsive force produced by the bag member even when the impact exerted upon the occupant's body may be lessened. If the hydraulic diameter exceeds 95 mm, then the impact is not lessened sufficiently and the occupant's body is exposed to the danger of secondary collision with articles provided within the automobile. Similarly, the permissible range of hydraulic diameter of the gas discharging outlet in the unfoldable inflating bag member is from 45 mm to 98 mm and from 50 mm to 100 mm respectively where the diameter of the air passage in the main bag member is 90 mm and 70 mm.

Figure 13:
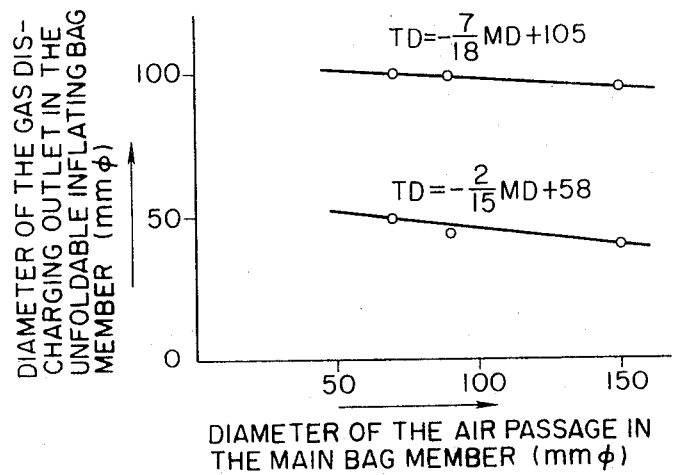
FIG. 13 shows graphically the relationship between the hydraulic diameter of the gas discharge outlet of the unfoldable inflating bag member and the hydraulic diameter of the air passage in the cushioning in bag member.
Figure 14:
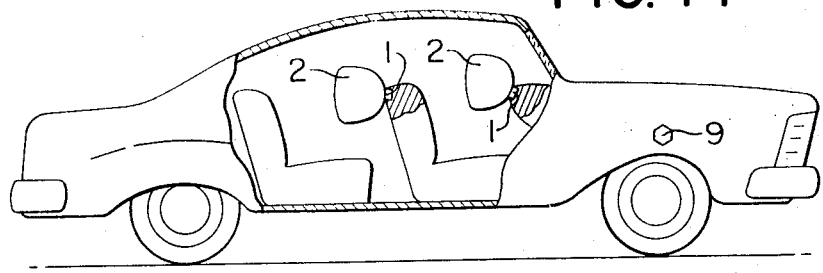
FIG. 14 shows diagrammatically the positioning of the restraint system of a vehicle.

Diagrammatically, the aforementioned relationship between the hydraulic diameter of the air passage in the main bag member and the hydraulic diameter of the gas discharging outlet in the unfoldable inflating bag member is expressed as shown in FIG. 13. FIG. 13 indicates that the relationship:

$$TD < -2/15\ MD + 58$$

(wherein, TD stands for the hydraulic diameter of the gas discharging outlet in the unfoldable inflating bag member or, in case of two or more bag members, TD stands for the combined hydraulic diameter, given by the unit of mm, and MD stands for the hydraulic diameter of the air passage in the main bag member given by the unit of mm) is impracticable because the occupant's body is exposed to the danger of secondary effects imputable to the repulsive force produced by the bag member even if the impact exerted on the occupant's body may be lessened. The relationship of TD −7/18 MD + 105 is similarly impracticable because the bag member fails to provide sufficient absorption of impact and the occupant's body is exposed to the danger of secondary collision into articles provided within the vehicle interior. From these observations, it has been learnt that, to effectively lessen the impact exerted upon the occupant's body with a repulsive force mild enough to prevent any adverse effects from being produced on the occupant's body at the time of violent deceleration of the travelling vehicle as by collision, the relationship between the diameter of the air passage in the main bag member and the diameter of the gas discharging outlet in the unfoldable inflating bag member should be selected so as to satisfy the following expression:

$$-2/15\ MD + 58 \leq TD \leq -7/18\ MD + 105$$

In this test, the trend observed was in the same relationship as mentioned above even when the inner volume of the main bag member, the inner volume of the unfoldable inflating bag member, and the speed of the truck were changed.

In the rapidly inflatable system constructed as mentioned above, the impact detecting means senses the impact of the travelling vehicle at the moment of violent deceleration as by collision and passes an electric current to the electric conductors 6 and 6a. Consequently, the gas-generating means 5 and 5a are actuated to generate or supply the compressed gas rapidly. The compressed gas rapidly unfolds and inflates the unfoldable inflating bag members 3 and 3a to the shape of bars. Simultaneously, the main bag member 2 is unfolded and expanded to full capacity as the unfoldable inflating bag members 3 and 3a are unfolded and inflated. This gives rise to negative pressure inside the main bag member 2, with the result that the outer air is admitted via the air passage 8. This has an overall effect of unfolding and inflating the main bag member 2 to the state illustrated in FIG. 6. The main bag member and the unfoldable inflating bag members which have all been inflated to full capacity serve to hold back the impinging occupant's body with its cushioning force. Then, the impact exerted thereafter on the occupant's body because of the impingement is eliminated by causing the air and the gas to be discharged via the air passage in the main bag member and the gas discharging outlet in the unfoldable inflating bag member respectively.

In the rapidly inflatable system of the present invention, the main bag member and the unfoldable inflating bag members are constructed so that the ratio of the inner volume of the unfoldable inflating bag member to the inner volume of the main bag member exceeds the level of 0.2 and the ratio of the hydraulic diameter of the air passage in the main bag member to the inner volume of the bag exceeds the level of 0.37. Consequently, the bag members can be unfolded and inflated to full capacity within the fixed time limit, i.e., within 35 ms of the moment the gas-generating means is actuated in consequence of the violent deceleration of the travelling vehicle as by collision.

Further, the rapidly inflatable system of the present invention is so constructed that the hydraulic diameter of the air passage in the main bag member and the hydraulic diameter of the gas discharging outlet in the unfoldable inflating bag member satisfy the relationship of $-2/15\ MD + 58 = TD = -7/18\ MD + 105$. Therefore, this system can effectively lessen the impact exerted on the occupant's body with the repulsive force mild enough to prevent any adverse effects from being produced on the occupant's body at the moment of violent deceleration of the travelling vehicle as by collision.

The said bag member 2 is normally stored in a folded state at a stationary position and, therefore, must be folded in a state which permits ready folding and unfolding. If this bag member 2 has the shape of a pyramidal column, it can be folded more easily into a smaller size. In this respect, it excels in stowability. Further, it can be folded with neatness and, therefore, can be unfolded without distorsion. The said bag member 2 is fixed in position on the supporting member 1 and is permitted to expand on the supporting member 1. Thus, the area in which the occupant's body impinges on the inflated bag member corresponds to the area of the supporting member 1. In consideration of this fact, the shape of a pyramidal column is suitable for the bag member in question in that it provides stabler unfolding of the bag than any other shape. Adoption of the shape of a pyramidal column has an additional advantage that, in an inflated state, the bag member of that shape offers a greater area of contact for the impinging occupant's body than the bag member of any other shape and that the inflated bag never fails to hold back the impinging occupant's body even if the occupant's body is thrown forward slightly out of normal course. The unfoldable inflating bag member 3, in this case, is also formed in the shape of a pyramidal column. This is because the bag member 3 has the a shape similar to that of the rapidly inflatable cushioning bag member 2 and, therefore, the said bag member 2 can be unfolded more easily and more properly.

We claim:

1. A rapidly-inflatable impact cushioning device for use on a high-speed travelling vehicle, said device comprising
   a. a rapidly-inflatable cushioning bag member fixedly positioned on a support member, said cushioning bag member being provided with an air passage communicating with the atmosphere;
   b. at least one unfoldable inflating bag member positioned within said rapidly-inflatable cushioning bag member and provided with a gas discharging outlet, said unfoldable bag member further being provided with gas-providing inflating means and being adapted to be inflated and unfolded when gas is received from said inflating means; said cushioning bag member being capable of receiving air from the atmosphere upon inflation of said unfoldable bag member, thereby permitting rapid and simultaneous inflation of both bag members when gas is received by said unfoldable bag member; and
   c. the hydraulic diameter of said air passage in said rapidly inflatable cushioning bag member and the hydraulic diameter of said gas discharging outlet in said unfoladable inflating bag member have the relationship expressed below:

$$-2/15\ MD + 58 \leq TD \leq -7/18\ MD + 105,$$

wherein TD stands for the hydraulic diameter of the gas discharging outlet in the unfoldable inflating bag member expressed in mm, and MD stands for the hydraulic diameter of the air passage in the main bag member expressed in mm.

2. A device according to claim 1 wherein the ratio of the hydraulic diameter of said air passage to the inner volume of said rapidly inflatable cushioning bag member exceeds the value of 0.37 mm/*l*.

3. A device according to claim 1 wherein the ratio of the inner volume of said unfoldable inflating bag member to the inner volume of said rapidly inflatable cushioning bag member exceeds the value of 0.2.

4. A device according to claim 1 wherein the ratio of the inner volume of said unfoldable inflating bag member to the inner volume of said rapidly inflatable cushioning bag member exceeds the value of 0.2, the ratio of the hydraulic diameter of said air passage to the inner volume of said cushioning bag member exceeds the volume of 0.37 mm/*l*.

* * * * *